United States Patent
Zhu et al.

(10) Patent No.: US 10,408,652 B2
(45) Date of Patent: Sep. 10, 2019

(54) CORIOLIS MASS FLOW MEASURING DEVICE WITH FOUR BENT MEASURING TUBES

(71) Applicant: Endress + Hauser Flowtec AG, Reinach (CH)

(72) Inventors: Hao Zhu, Freising (DE); Alfred Rieder, Landshut (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 43 days.

(21) Appl. No.: 15/540,048

(22) PCT Filed: Nov. 18, 2015

(86) PCT No.: PCT/EP2015/076931
§ 371 (c)(1),
(2) Date: Jun. 27, 2017

(87) PCT Pub. No.: WO2016/107694
PCT Pub. Date: Jul. 7, 2016

(65) Prior Publication Data
US 2017/0356777 A1      Dec. 14, 2017

(30) Foreign Application Priority Data

Dec. 31, 2014  (DE) .......................... 10 2014 019 399
Mar. 31, 2015  (DE) .......................... 10 2015 104 931

(51) Int. Cl.
*G01F 1/84* (2006.01)
*G01F 25/00* (2006.01)

(52) U.S. Cl.
CPC .......... *G01F 1/8413* (2013.01); *G01F 1/8422* (2013.01); *G01F 1/8477* (2013.01); *G01F 25/0007* (2013.01)

(58) Field of Classification Search
CPC .... G01F 1/8413; G01F 1/8422; G01F 1/8477; G01F 25/0007
See application file for complete search history.

(56) References Cited

U.S. PATENT DOCUMENTS 7,946,187 B2   5/2011   Hussain
8,613,228 B2   12/2013  Hussain
(Continued)

FOREIGN PATENT DOCUMENTS

CN   101019008 A   8/2007
CN   102667421 A   9/2012
(Continued)

OTHER PUBLICATIONS

German Search Report, German Patent Office, Munich, DE, dated Aug. 12, 2015.
(Continued)

*Primary Examiner* — Francis C Gray
(74) *Attorney, Agent, or Firm* — Bacon & Thomas, PLLC

(57) ABSTRACT

A Coriolis mass flow measuring device includes four bent measuring tubes, two exciter mechanisms, and two sensor arrangements. All four measuring tubes are joined inlet end and outlet end with collectors, where the measuring tubes are connected inlet end and outlet end pairwise with node plates to form oscillators, where the exciter mechanisms are adapted to excite bending oscillation working modes between the two measuring tubes of an oscillator, where the first oscillator and the second oscillator have bending oscillation working modes with first and second working mode eigenfrequencies ($f_{11}$, $f_{12}$), where the magnitude of the difference of the working mode eigenfrequencies of the two oscillators ($|f_{11}-f_{12}|$) amounts to at least 0.1 times, for example, at least 0.2 times and especially at least 0.4 times the lower of the two working mode eigenfrequencies, where
(Continued)

Figure 2B:
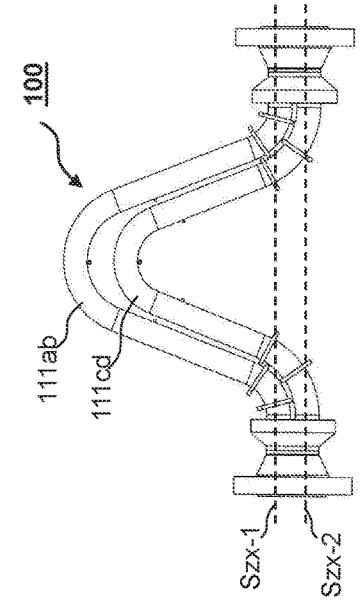

the sensor arrangements are adapted to register oscillations of the oscillators.

12 Claims, 3 Drawing Sheets

(56) References Cited

U.S. PATENT DOCUMENTS

| | | | | |
|---|---|---|---|---|
| 2005/0252307 | A1* | 11/2005 | Andresen | G01F 1/8409 73/861.355 |
| 2006/0016273 | A1* | 1/2006 | Bitto | G01F 1/8409 73/861.355 |
| 2008/0223149 | A1* | 9/2008 | Rieder | G01F 1/8409 73/861.357 |
| 2012/0042732 | A1* | 2/2012 | Zhu | G01F 1/74 73/861.18 |
| 2012/0192658 | A1* | 8/2012 | Hussain | G01F 1/8413 73/861.357 |
| 2017/0356777 | A1 | 12/2017 | Zhu | |

FOREIGN PATENT DOCUMENTS

| | | |
|---|---|---|
| CN | 102735299 A | 10/2012 |
| DE | 102004035971 A1 | 2/2006 |
| DE | 102008039867 A1 | 3/2010 |
| DE | 102009055069 A1 | 6/2011 |
| DE | 102010039627 A1 | 2/2012 |
| DE | 102011010178 A1 | 8/2012 |
| DE | 102012109729 A1 | 5/2014 |
| DE | 102015104931 A1 | 6/2016 |
| EP | 2485020 A1 | 8/2012 |
| WO | 2004017027 A1 | 2/2004 |

OTHER PUBLICATIONS

International Search Report, EPO, The Netherlands, dated Mar. 2, 2016.
English Translation of the International Preliminary Report on Patentability, WIPO, Geneva, CH, dated Jul. 13, 2017.
Chinese Search Report in corresponding Chinese Application No. 201580071879.1, dated Mar. 22, 2019.

* cited by examiner

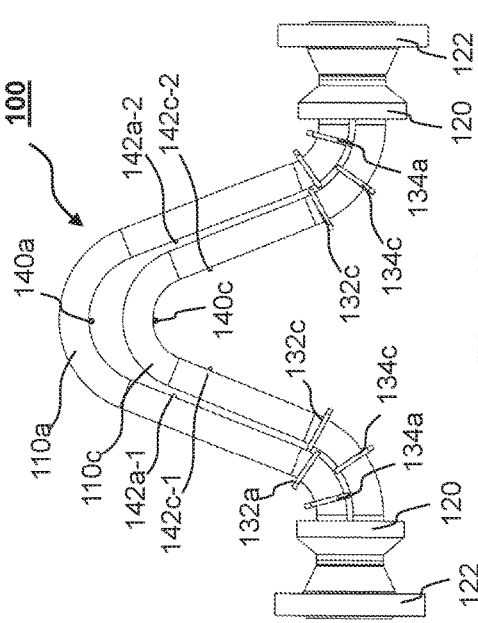
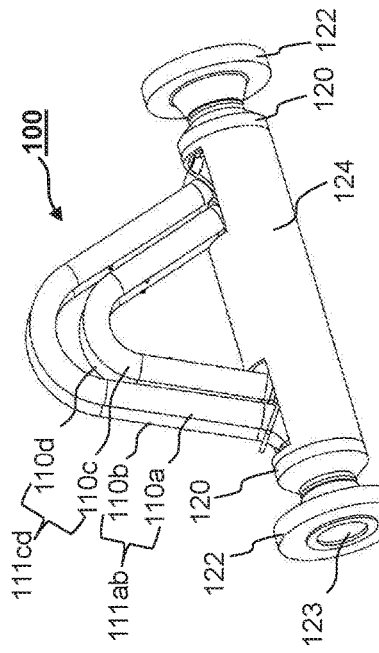
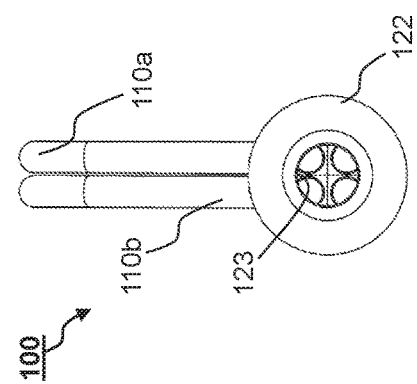
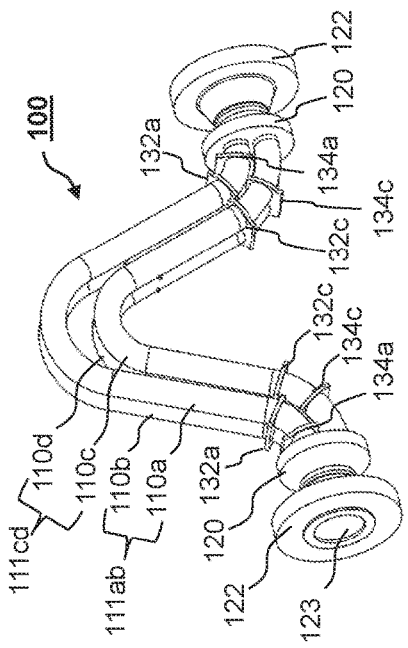

CORIOLIS MASS FLOW MEASURING DEVICE WITH FOUR BENT MEASURING TUBES

The present invention relates to a Coriolis mass flow measuring device (in the following CMD) with two measuring tube pairs bent in the resting position. Such CMD are known from Offenlegungsschrifts DE 10 2009 055 069 A1, DE 10 2010 039 627 A1, WO 2012/089431 A1 and DE 10 2011 010 178 A1. In these Offenlegungsschrifts, the measuring tubes of the CMD are excited mechanically coupled. This is constructively very complex and can lead to large mechanical stresses, especially thermomechanical stresses, in the measuring tubes. It is, therefore, an object of the present invention to remedy this situation.

The object is achieved according to the invention by the CMD as defined in independent patent claim 1.

The Coriolis mass flow measuring device of the invention (in the following CMD) includes four measuring tubes; at least a first exciter mechanism and a second exciter mechanism; and at least a first sensor arrangement and a second sensor arrangement, wherein all four measuring tubes are joined inlet end and outlet end with collectors (3), wherein the first measuring tube and the second measuring tube are connected with one another inlet end and outlet end with, in each case, at least one rigid node plate, which is arranged spaced from the respective collector, in order to form a first oscillator, wherein the first exciter mechanism is adapted to excite a bending oscillation working mode between the two measuring tubes of the first oscillator, wherein the third measuring tube and the fourth measuring tube are connected with one another inlet end and outlet end with, in each case, at least one rigid node plate, which is arranged spaced from the respective collector, in order to form a second oscillator, wherein the second exciter mechanism is adapted to excite a bending oscillation working mode between the two measuring tubes of the second oscillator, wherein the first oscillator and the second oscillator have respective bending oscillation working modes with respective first and second working mode eigenfrequencies ($f_{11}$, $f_{12}$), wherein the magnitude of the difference of the working mode eigenfrequencies of the two oscillators ($|f_{11}-f_{12}|$) amounts to at least 0.1 times, for example, at least 0.2 times and especially at least 0.4 times the lower of the two working mode eigenfrequencies, wherein the first sensor arrangement is adapted to register oscillations of the first oscillator, and wherein the second sensor arrangement is adapted to register oscillations of the second oscillator.

In a further development of the invention, the measuring tubes of the first oscillator extend symmetrically to a first mirror plane, wherein the measuring tubes of the second oscillator extend likewise symmetrically to the first mirror plane, which extends between the measuring tubes of the first oscillator and between the measuring tubes of the second oscillator.

In a further development of the invention, the measuring tubes of the first oscillator extend symmetrically to a second mirror plane, which extends perpendicular to the first mirror plane and intersects the measuring tubes of the first oscillator, wherein the measuring tubes of the second oscillator likewise extend symmetrically to the second mirror plane, and are intersected by the second mirror plane.

In a further development of the invention, the CMD further includes an operating circuit for driving the exciter mechanisms and for registering the signals of the sensor arrangements, wherein the operating circuit is adapted so to drive the exciter mechanisms that the bending oscillation working modes of the first and second oscillators are excited independently of one another at the respective working mode eigenfrequencies.

In a further development of the invention, the operating circuit is adapted so to drive the exciter mechanisms that the bending oscillation working modes of the first and second oscillators are excited simultaneously.

In a further development of the invention, the first and second oscillators are adapted such that the bending oscillation working modes are superimposed by deflections caused by Coriolis forces (in the following referred to as "Coriolis deflections") when a mass flow passes through the measuring tubes, wherein the first sensor arrangement and the second sensor arrangement have each at least two sensor elements, in order to register a phase shift between the respective Coriolis deflections and the associated bending oscillation working mode.

In a further development of the invention, the operating circuit is adapted as a function of the phase shift of the respective Coriolis deflections to ascertain a first mass flow ($dm/dt_{\_1}$) through the measuring tubes of the first oscillator and a second mass flow ($dm/dt_{\_2}$) through the measuring tubes of the second oscillator, and to output the sum of the first mass flow ($dm/dt_{\_1}$) and the second mass flow ($dm/dt_{\_2}$) as total mass flow ($dm/dt$, where $dm/dt=dm/dt_{\_1}+dm/dt_{\_2}$).

In a further development of the invention, the CMD includes bent measuring tubes, wherein the measuring tubes have, in each case, a tube central axis, wherein inlet end and outlet end intersections of the tube central axes of the measuring tubes of one oscillator with the end faces of the measuring tubes define, in each case, a base plane of the oscillator, wherein the measuring tubes of an oscillator have, in each case, a length (l), wherein the tube central axes of the measuring tubes of the first oscillator—with reference to the base plane of the first oscillator—face away from the base plane of the second oscillator at the half tube length (l/2), and wherein the tube central axes of the measuring tubes of the second oscillator—with reference to the base plane of the second oscillator—face toward the measuring tubes of the first oscillator at the half tube length (l/2).

In an embodiment of the invention, the working mode eigenfrequency of the second oscillator is greater than the working mode eigenfrequency of the first oscillator.

In a further development of the invention, the measuring tubes are bent, wherein the measuring tubes have, in each case, a tube central axis, wherein inlet end and outlet end intersections of the tube central axes of the measuring tubes of an oscillator with the end faces of the measuring tubes define, in each case, a base plane of the oscillator, wherein the measuring tubes of an oscillator have, in each case, a length, wherein the tube central axes of the measuring tubes of the first oscillator—with reference to the base plane of the first oscillator—face away from the base plane of the second oscillator at the half tube length, and wherein the tube central axes of the measuring tubes of the second oscillator—with reference to the base plane of the second oscillator—face away from the base plane of the first oscillator at the half tube length.

In a further development of the invention, the inlet end and outlet end collectors are embodied stably in such a manner that they fulfill the functionality of node plates.

In a further development, the CMD includes a support tube, which connects the inlet end collector and the outlet end collector rigidly with one another.

In a further development of the invention, the first measuring tube and the third measuring tube lie in a shared first plane, and the second measuring tube and the fourth measuring tube lie in a shared second plane, wherein the first plane and the second plane extend parallel to one another.

The shared first plane and the shared second plane are especially the planes, in which the measuring tube axes of the measuring tubes extend.

The shared first plane and the second shared plane extend, especially, parallel to the above defined, first mirror plane.

For achieving the different working mode eigenfrequencies, the oscillators according to a further development of the invention differ in at least one of the following properties:

wall thickness of the measuring tubes
oscillatable length of the measuring tubes
inner diameter of the measuring tubes
outer diameter of the measuring tubes
tube material
shape of the node plates
position of the node plates
supplemental masses on the measuring tubes, wherein currently the oscillatable length and/or the position of the node plates and/or the shape of the node plates are preferred as different properties.

Figure 2C:
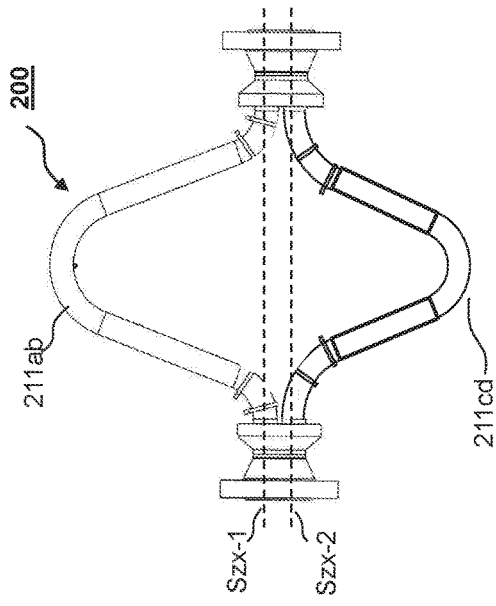
Figure 2A:
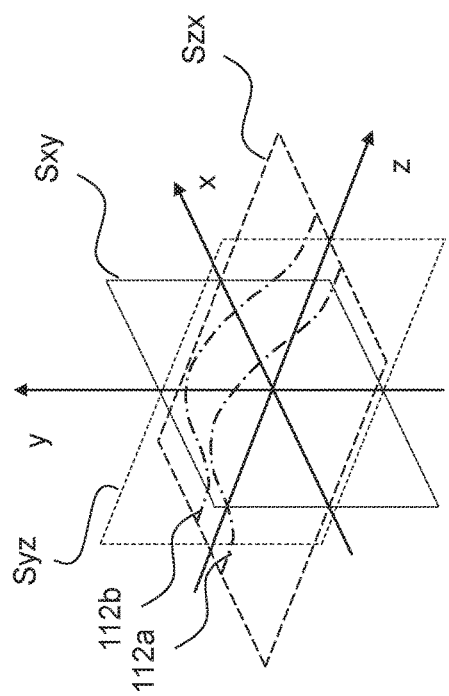
Figure 4:
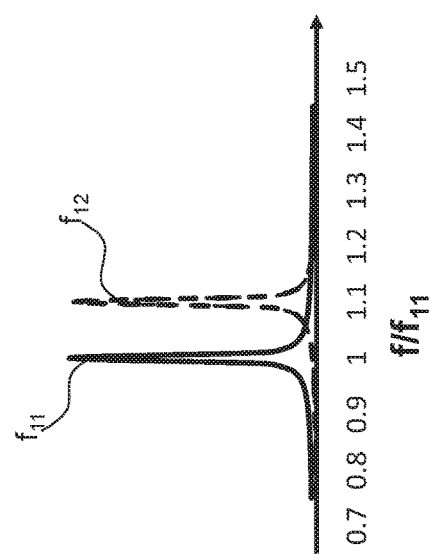
Figure 3B:
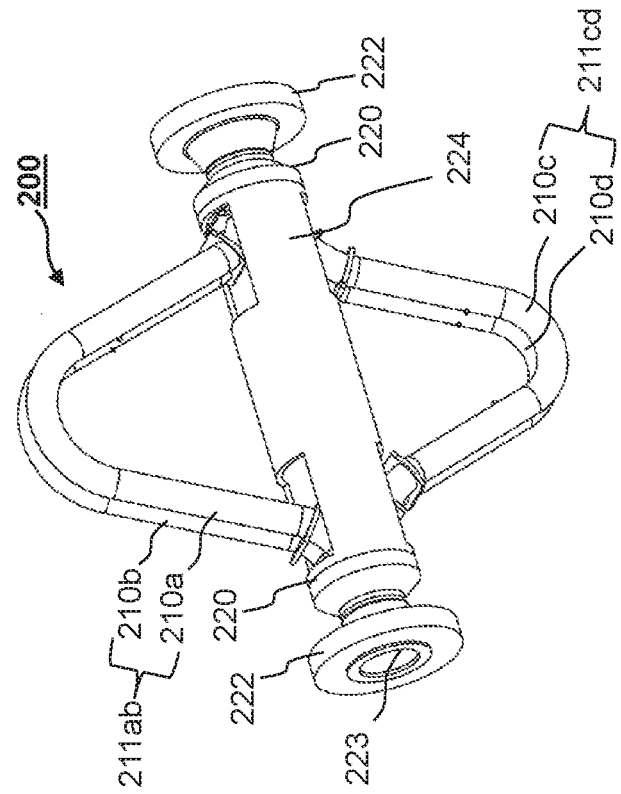
Figure 3A:
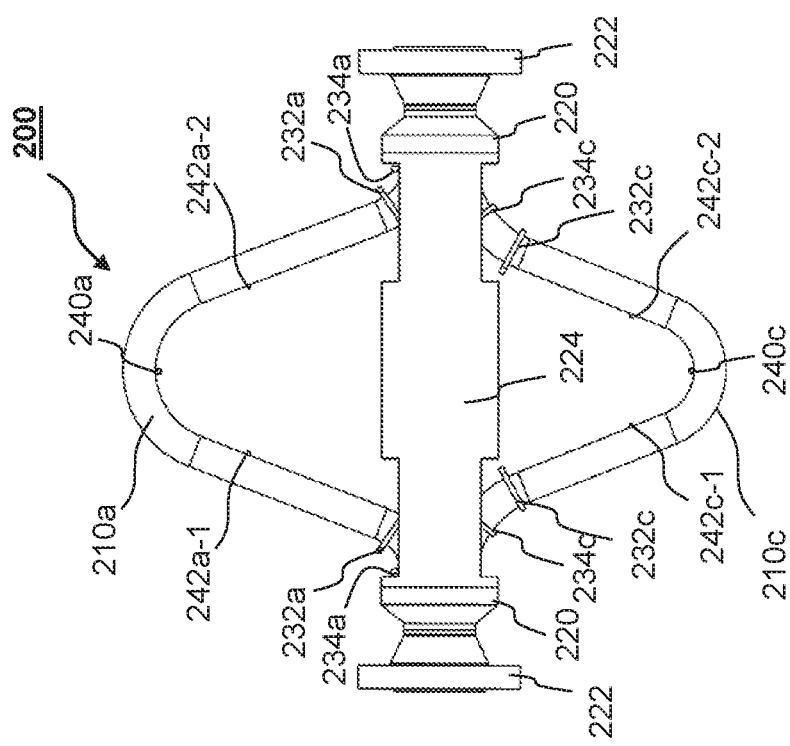

The invention will now be now explained in greater detail based on the examples of embodiments illustrated in the drawing, the figures of which show as follows:

FIG. 1a a schematic front view of a first example of an embodiment of a CMD of the invention;

FIG. 1b a schematic side view of the first example of an embodiment of a CMD of the invention without support tube;

FIG. 1c a perspective view of the first example of an embodiment of a CMD of the invention without support tube;

FIG. 1d a perspective view of the first example of an embodiment of a CMD of the invention with mounted support tube;

FIG. 2a a coordinate system for describing some properties of the CMD of the invention;

FIG. 2b a side view of the first embodiment of the invention to show the position of a first base plane and a second base plane;

FIG. 2c a side view of the second embodiment of the invention to show the position of a first base plane and a second base plane;

FIG. 3a a schematic side view of a second example of an embodiment of a CMD of the invention with mounted support tube;

FIG. 3b a perspective view of the second example of an embodiment of a CMD of the invention with mounted support tube; and FIG. 4 a diagram with first and second working mode eigenfrequencies The first example of an embodiment of a CMD 100 of the invention shown in FIGS. 1a to 1d includes four bent measuring tubes 110a, 110b, 110c, 110d. Measuring tubes 110a, 110b, 110c, 110d extend between an inlet end collector 120 and an outlet end collector 120, and are securely connected with such, for example, by roll expansion, hard soldering or welding. Extending between the collectors 120 is a rigid support tube 124, which is connected securely with both collectors, whereby the collectors 120 are rigidly coupled with one another. Support tube 124 has, on its upper side, openings, through which the measuring tubes 110a, 110b, 110c, 110d extend from the collectors 120 out of the support tube 124.

Collectors 120 have terminally, in each case, a flange 122, by means of which the CMD can be installed into a pipeline. A mass flow is led through central openings 123 in the flanges 122 of the CMD 100, especially through its measuring tubes 110a, 110b, 110c, 110d, in order to measure the mass flow.

A first measuring tube 110a and a second measuring tube 110b are connected inlet end and outlet end, in each case, with two rigid node plates 132a, 134a, wherein by the position of the two innermost 132a of the node plates, thus by those, which inlet end, respectively outlet end, in each case, are farthest removed from the corresponding collectors 120, an oscillatory length of a first oscillator (111ab) formed by the first measuring tube 110a and the second measuring tube 110b is established. This free oscillatory length has a major influence on a so-called bending oscillation working mode of the first oscillator (111ab), especially on its eigenfrequency, with which the first oscillator (111ab) is excited.

A third measuring tube 110c and a fourth measuring tube 110d are connected inlet end and outlet end, in each case, with two rigid node plates 132c, 134c, wherein by the position of the two innermost 132c of the node plates, thus by those, which inlet end, respectively outlet end, in each case, are farthest removed from the corresponding collectors 120, an oscillatory length of a second oscillator (111cd) formed by the third measuring tube 110c and the fourth measuring tube 110d is established. This free oscillatory length has a major influence on a so-called bending oscillation working mode of the second oscillator (111cd), especially on its eigenfrequency, with which the second oscillator (111cd) is excited.

All outer node plates 134a, 134c, which are arranged between the respective inner node plates 132a, 132c and the collectors 120, serve especially to define other oscillation nodes, in order, on the one hand, to reduce maximum mechanical stresses on the oscillating measuring tubes, and, on the other hand, to minimize out-coupling of oscillatory energy into a pipeline, in which the CMD is installed, respectively to minimize the in-coupling of disturbing oscillations from the pipeline.

The node plates 132a, 132c, 134a, 134c define oscillation nodes for measuring tubes. Between the innermost couplers, i.e. node plates 132a, 132c, the measuring tubes 110a, 110b can oscillate freely, so that the positions of the innermost couplers, i.e. node plates, essentially determine the oscillation characteristics of the oscillator formed by the measuring tubes 110a, 110b, especially eigenfrequencies of oscillatory modes of the oscillator.

The free oscillatory length of the measuring tubes 110a, 110b of the first oscillator (111ab) is significantly greater than the free oscillatory length of the measuring tubes 110c, 110d of the second oscillator (111cd), wherein the measuring tubes 110a, 110b of the first oscillator (111ab) reach to a higher arc than the measuring tubes 110c, 110d of the second oscillator (111cd). This leads to the fact that, for example, in the case of the illustrated CMD, which has measuring tubes with an outer diameter of 3 inch, thus about 76 mm, and a wall thickness of 3.6 mm, and assuming filling of the measuring tubes with a medium with the density of water, the first oscillator (111ab) has a bending oscillation working mode with an eigenfrequency of about 110 Hz, while the eigenfrequency of the bending oscillation working mode of the second oscillator (111cd) amounts to about 160 Hz.

Before explaining the operation of the CMD 100 of the invention in more detail, some symmetry characteristics of the CMD of the invention will be explained based on FIG. 2. Shown in FIG. 2 are measuring tube central axes 112a, 112b of the first measuring tube and of the second measuring tube, which form the first oscillator (111ab). Measuring tube central axes 112a, 112b extend symmetrically to a first mirror plane Syz, which extends between the measuring tubes. The measuring tube central axes extend further symmetrically to a second mirror plane Sxy, which extends perpendicular to the first mirror plane Syz.

The measuring tube axes 112a, 112b extend preferably in planes, which extend parallel to the first mirror plane.

Regarding a third plane Szx, which extends perpendicular to the first mirror plane and to the second mirror plane, and in which the measuring tube axes 112a, 112b run into the collectors, there is no symmetry of the measuring tubes. However, third planes Szx define a respective base plane for each oscillator as shown in FIGS. 2b and 2c.

These explanations hold correspondingly for the measuring tube axes of the third and fourth measuring tubes.

Preferably, the axes of the first measuring tube and of the third measuring tube extend in a first plane and the measuring tube axes of the second and fourth measuring tubes extend in a second plane, and both planes are parallel to the first mirror plane.

The line of intersection between the first mirror plane Syz and the third plane defines a Z-axis of a coordinate system of the CMD. The line of intersection between the second mirror plane Sxy and the third plane Szx defines an X-axis of the coordinate system, and the line of intersection between first mirror plane Syz and the second mirror plane defines the Y-axis of the coordinate system. With the coordinates defined in such manner, we return to FIGS. 1a to 1d.

For exciting bending oscillations of the measuring tubes in the X-direction, there are provided—with reference to the longitudinal direction, i.e. the Z-axis, in the middle of the CMD 100—a first exciter mechanism 140a between the first measuring tube 110a and the second measuring tube 110b of the first oscillator (111ab) and a second exciter mechanism 140c between the third measuring tube 110c and the fourth measuring tube 110d of the second oscillator (111cd). The exciter mechanisms are, for example, inductive exciter mechanisms, which comprise, for example, a plunger coil on one measuring tube and plunger armature on the oppositely lying measuring tube. For registering the oscillations of the measuring tube pairs of the oscillators, provided in the longitudinal direction symmetrically to the exciter mechanisms 140a, 140c are, in each case, a first sensor arrangement 142a-1, 142c-1 and a second sensor arrangement 142a-2, 142c-2, which, in each case, are embodied as an inductive arrangement with a plunger coil on one tube and a plunger armature on the other tube. Details in this connection are known to those skilled in the art and do not require further explanation here. (In the interest of perspicuity, the positions and reference characters of the exciter mechanism and the sensor arrangements are only shown in FIG. 1b).

The oscillators are excited with their particular eigenfrequencies, wherein, for this, either the exciter mechanisms can be driven by independent driver circuits with the signals of the respective eigenfrequencies, or wherein the exciter mechanisms can be connected in series and supplied with a superimposed signal having the eigenfrequencies of both oscillators. Due to the high quality of the oscillators, each oscillator is essentially only excited with its own eigenfrequency. This is indicated by the diagram in FIG. 4, wherein a eigenfrequency $f_{12}$ of the second oscillator is about 1.1 times the eigenfrequency $f_{11}$ of the first oscillator.

FIGS. 3a and 3b show a second example of an embodiment of a CMD 200 of the invention having four bent measuring tubes 210a, 210b, 210c, 210d. The measuring tubes 210a, 210b, 210c, 210d extend between an inlet end collector 220 and an outlet end collector 220 and are connected securely with these, for example, by roll expansion, hard soldering or welding. Extending between the collectors 220 is a rigid support tube 224, which is connected securely with both collectors, whereby the collectors 220 are rigidly coupled with one another. Support tube 224 has on its upper side and underside openings, through which the measuring tubes 210a, 210b, 210c, 210d extend from the collectors 220 pairwise out of the support tube 224.

Collectors 220 have terminally, in each case, a flange 222, by means of which the CMD can be installed into a pipeline. A mass flow is led through central openings 223 in the flanges 222 of the CMD 200, and through the measuring tubes 210a, 210b, 210c, 210d, in order to measure the mass flow.

The second example of an embodiment of a CMD 200 differs from the first example of an embodiment essentially in that the measuring tubes run pairwise in different directions out of the support tube and back in.

A first measuring tube 210a and a second measuring tube 210b are connected inlet end and outlet end, in each case, with two node plates 232a, 234a, wherein by the position of the two innermost 232a of the node plates, thus by those, which inlet end, respectively outlet end, in each case, are farthest removed from the corresponding collectors 220, an oscillatory length of a first oscillator (211ab) formed by the first measuring tube 210a, and the second measuring tube 210b is established. This free oscillatory length has a major influence on a so-called bending oscillation working mode of the first oscillator (211ab), especially on its eigenfrequency, with which the first oscillator (211ab) is excited.

A third measuring tube 210c and a fourth measuring tube 210d are connected inlet end and outlet end, in each case, with two node plates 232c, 234c, wherein by the position of the two innermost 232c of the node plates, thus by those, which inlet end, respectively outlet end, in each case, are farthest removed from the corresponding collectors 220, an oscillatory length of a second oscillator (211cd) formed by the third measuring tube 210c and the fourth measuring tube 210d is established. This free oscillatory length has a major influence on a so-called bending oscillation working mode of the second oscillator (211cd), especially on its eigenfrequency, with which the second oscillator (211cd) is excited.

All outer node plates 234a, 234c, which are arranged between the inner node plates 232a, 232c and the collectors 220, serve especially to define other oscillation nodes, in order, on the one hand, to reduce the maximum mechanical stresses on the oscillating measuring tubes, and, on the other hand, to minimize out-coupling of oscillatory energy in a pipeline, in which the CMD is mounted, respectively to minimize the in-coupling of disturbing oscillations from the pipeline.

The node plates 232a, 232b, 234a, 234b define oscillation nodes for measuring tubes. Between the innermost couplers, respectively node plates 232a, 232c, the measuring tubes 210a, 210b can oscillate freely, so that the positions of the innermost couplers, i.e. node plates, essentially determine the oscillation characteristics of the oscillator formed by the measuring tubes 210a, 210b, especially eigenfrequencies of oscillatory modes of the oscillator.

The free oscillatory length of the measuring tubes 210a, 210b of the first oscillator (211ab) is significantly greater than the free oscillatory length of the measuring tubes 210c, 210d of the second oscillator (211cd), wherein the measuring tubes 210a, 210b of the first oscillator (211ab) in reach to a higher arc than the measuring tubes 210c, 210d of the second oscillator (211cd). This leads to the fact that, for example, in the case of the illustrated CMD, which has measuring tubes with an outer diameter of 3 inch, thus about 76 mm, and a wall thickness of 3.6 mm, and assuming filling of the measuring tubes with a medium with the density of water, the first oscillator (211ab) has a bending oscillation working mode with an eigenfrequency of about 110 Hz, while the eigenfrequency of the bending oscillation working mode of the second oscillator (211cd) amounts to about 160 Hz.

For exciting bending oscillations of the measuring tubes in the X-direction, there are provided—with reference to the longitudinal direction, i.e. the Z-axis, in the middle of the CMD 200—a first exciter mechanism 240a between the first measuring tube 210a and the second measuring tube 210b of the first oscillator (211ab) and a second exciter mechanism 240c between the third measuring tube 210c and the fourth measuring tube 210d of the second oscillator (211cd). The exciter mechanisms are, for example, inductive exciter mechanisms, which comprise, for example, a plunger coil on one measuring tube and a plunger armature on the oppositely lying measuring tube. For registering the oscillations of the measuring tube pairs of the oscillators, provided in the longitudinal direction symmetrically to the exciter mechanisms 240a, 240c are, in each case, a first sensor arrangement 242a-1, 242c-1 and a second sensor arrangement 242a-2, 242c-2, which, in each case, are embodied as an inductive arrangement with a plunger coil on one tube and a plunger armature on the other pipe. Details in this connection are known to those skilled in the art, and do not require further explanation here. (In the interest of perspicuity, the positions and reference characters of the exciter mechanism and the sensor arrangements are only shown in FIG. 2a).

The oscillators are excited with their particular eigenfrequencies, wherein, for this, either the exciter mechanisms can be driven by independent driver circuits with the signals of the respective eigenfrequencies, or wherein the exciter mechanisms can be connected in series and supplied with a superimposed signal having the eigenfrequencies of both oscillators. Due to the high quality of the oscillators, each oscillator is essentially only excited with its own eigenfrequency.

The mechanically independent exciting of the oscillators of the CMD of the invention enables, compared with the above discussed CMD of the state of the art with mechanically coupled excitations, a considerable reduction of thermo-mechanical and oscillatory mechanical stresses acting on the components of the oscillators, especially the measuring tubes. Since then the stiffening components of the CMD of the invention do not have to supply as much reactive force for suppressing asymmetries due to tolerances, such stiffening components can be embodied lighter and with savings of material.

The marked frequency separation between the two oscillators minimizes mutual disturbing influences.

Furthermore, not requiring symmetry between the oscillators, especially not requiring a symmetric flow resistance, reduces the flow resistance in the measuring tubes of the higher frequency oscillator. This reduces the total flow resistance of the CMD compared with symmetric CMDs with four measuring tubes.

The invention claimed is:

1. A Coriolis mass flow measuring device (100) comprising four measuring tubes (110a, 110b, 110 c, 110d), especially bent measuring tubes, at least a first exciter mechanism (140a) and a second exciter mechanism (140c), at least a first sensor arrangement and a second sensor arrangement,
wherein all four measuring tubes (110a, 110b, 110c, 110d) are joined inlet end and outlet end with collectors (120),
wherein the first measuring tube and the second measuring tube are connected with one another inlet end and outlet end with, in each case, at least one rigid node plate, which is arranged spaced from the respective collector, in order to form a first oscillator (111ab),
wherein the first exciter mechanism is adapted to excite a bending oscillation working mode between the two measuring tubes of the first oscillator (111ab),
wherein the third measuring tube and the fourth measuring tube are connected with one another inlet end and outlet end with, in each case, at least one rigid node plate, which is arranged spaced from the respective collector, in order to form a second oscillator (111cd),
wherein the second exciter mechanism is adapted to excite a bending oscillation working mode between the two measuring tubes of the second oscillator (111cd),
wherein the first oscillator (111ab) and the second oscillator (111cd) have bending oscillation working modes with first and second working mode eigenfrequencies ($f_{11}$, $f_{12}$),
wherein the magnitude of the difference of the working mode eigenfrequencies of the two oscillators ($|f_{11}-f_{12}|$) amounts to at least 0.1 times the lower of the two working mode eigenfrequencies,
wherein the first sensor arrangement is adapted to register oscillations of the first oscillator (111ab), and wherein the second sensor arrangement is adapted to register oscillations of the second oscillator (111cd).

2. The Coriolis mass flow measuring device (100) as claimed in claim 1, further comprising an operating circuit for driving the exciter mechanisms and for registering the signals of the sensor arrangements, wherein the operating circuit is adapted so to drive the exciter mechanisms that the bending oscillation working modes of the first and second oscillators are excited independently of one another at the respective working mode eigenfrequencies.

3. The Coriolis mass flow measuring device (100) as claimed in claim 1, wherein the operating circuit is adapted so to drive the exciter mechanisms that the bending oscillation working modes of the first and second oscillators are excited simultaneously.

4. The Coriolis mass flow measuring device (100) as claimed in claim 1, wherein the first and second oscillators are adapted such that the bending oscillation working modes are superimposed by deflections caused by Coriolis forces (in the following referred to as "Coriolis deflections"), when a mass flow passes through the measuring tubes, wherein the first sensor arrangement and the second sensor arrangement have each at least two sensor elements, in order to register a phase shift between the respective Coriolis deflections and the associated bending oscillation working mode.

5. The Coriolis mass flow measuring device (100) as claimed in claim 3, wherein the operating circuit is adapted to ascertain a first mass flow ($dm/dt_{-1}$) through the measuring tubes of the first oscillator (111ab) as a function of the phase shift of the respective Coriolis forces, and to ascertain a second mass flow ($dm/dt_{-2}$) through the measuring tubes of the second oscillator, and to output the sum of the first mass flow ($dm/dt_{-1}$) and the second mass flow ($dm/dt_{-2}$) as total mass flow ($dm/dt$, where $dm/dt = dm/dt_{-1} + dm/dt_{-2}$).

6. The Coriolis mass flow measuring device (1) as claimed in claim 1, wherein the measuring tubes have, in each case, a tube central axis, wherein inlet end and outlet end intersections of the tube central axes of the measuring tubes of an oscillator with the end faces of the measuring tubes define, in each case, a base plane (Szx-1, Szx-2) of the oscillator, wherein the measuring tubes of an oscillator have, in each case, a length (l), wherein the tube central axes of the measuring tubes of the first oscillator—with reference to the base plane (Szx-1) of the first oscillator—face away from the base plane (Szx-2) of the second oscillator at the half tube length (l/2), and wherein the tube central axes of the measuring tubes of the second oscillator—with reference to the base plane (Szx-2) of the second oscillator—face toward the measuring tubes of the first oscillator at the half tube length (l/2).

7. The Coriolis mass flow measuring device (100) as claimed in claim 6, wherein the working mode eigenfrequency of the second oscillator is greater than the working mode eigenfrequency of the first oscillator.

8. The Coriolis mass flow measuring device (200) as claimed in claim 1, wherein the measuring tubes have, in each case, a tube central axis, wherein inlet end and outlet end intersections of the tube central axes of the measuring tubes of an oscillator with the end faces of the measuring tubes define, in each case, a base plane (Szx-1; Szx-2) of the oscillator, wherein the measuring tubes of an oscillator have, in each case, a length (l), wherein the tube central axes of the measuring tubes of the first oscillator—with reference to the base plane (Szx-1) of the first oscillator—face away from the base plane (Szx-2) of the second oscillator at the half tube length (l/2), and wherein the tube central axes of the measuring tubes of the second oscillator—with reference to the base plane (Szx-2) of the second oscillator—face away from the base plane of the first oscillator (Szx-1) at the half tube length (l/2).

9. The Coriolis mass flow measuring device (100) as claimed in claim 1, further comprising a support tube, which connects the inlet end collector and the outlet end collector rigidly with one another.

10. The Coriolis mass flow measuring device (100) as claimed in claim 1, wherein the first oscillator differs from the second oscillator in at least one of the following properties:
 oscillatable length of the measuring tubes
 position of the node plates.

11. The Coriolis mass flow measuring device (100) as claimed in claim 1, wherein the magnitude of the difference of the working mode eigenfrequencies of the two oscillators ($|f_{11}-f_{12}|$) amounts to at least 0.2 times the lower of the two working mode eigenfrequencies.

12. The Coriolis mass flow measuring device (100) as claimed in claim 1, wherein the magnitude of the difference of the working mode eigenfrequencies of the two oscillators ($|f_{11}-f_{12}|$) amounts to at least 0.4 times the lower of the two working mode eigenfrequencies.

\* \* \* \* \*